(12) United States Patent
Otake et al.

(10) Patent No.: US 9,180,885 B2
(45) Date of Patent: Nov. 10, 2015

(54) DRIVE ASSIST APPARATUS, AND INFORMATION PROCESSING APPARATUS FOR VEHICLES

(75) Inventors: Hirotada Otake, Toyota (JP); Masaaki Yamaoka, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/002,865

(22) PCT Filed: Mar. 18, 2011

(86) PCT No.: PCT/JP2011/056582
§ 371 (c)(1),
(2), (4) Date: Sep. 3, 2013

(87) PCT Pub. No.: WO2012/127568
PCT Pub. Date: Sep. 27, 2012

(65) Prior Publication Data
US 2013/0338852 A1   Dec. 19, 2013

(51) Int. Cl.
| | | |
|---|---|---|
| *B60W 30/18* | (2012.01) |
| *B60T 7/12* | (2006.01) |
| *G08G 1/0962* | (2006.01) |
| *B60W 40/076* | (2012.01) |
| *B60W 50/00* | (2006.01) |

(52) U.S. Cl.
CPC *B60W 30/18* (2013.01); *B60T 7/12* (2013.01); *B60W 40/076* (2013.01); *G08G 1/09626* (2013.01); *B60T 2201/04* (2013.01); *B60W 2050/0089* (2013.01); *B60W 2520/105* (2013.01); *B60W 2550/142* (2013.01)

(58) Field of Classification Search
None
See application file for complete search history.

(56) References Cited

U.S. PATENT DOCUMENTS

| | | | |
|---|---|---|---|
| 6,292,736 B1 * | 9/2001 | Aruga et al. | 701/95 |
| 2002/0143441 A1 * | 10/2002 | Yamaguchi et al. | 701/22 |

(Continued)

FOREIGN PATENT DOCUMENTS

| | | |
|---|---|---|
| EP | 1 096 460 A2 | 5/2001 |
| JP | 9 166209 | 6/1997 |
| JP | 2001-126196 A | 5/2001 |
| JP | 2004-325777 A | 11/2004 |
| JP | 2005 91083 | 4/2005 |

(Continued)

OTHER PUBLICATIONS

International Search Report Issued Jun. 14, 2011 in PCT/JP11/056582 Filed Mar. 18, 2011.

*Primary Examiner* — John R Olszewski
*Assistant Examiner* — Jess Whittington
(74) *Attorney, Agent, or Firm* — Oblon, McClelland, Maier & Neustadt, L.L.P.

(57) ABSTRACT

A drive assist apparatus which performs driving assistance in a predetermined interval having a gradient, includes average gradient information acquisition means for acquiring average gradient information of the predetermined interval; driving status information acquisition means for acquiring driving status information of a host vehicle; and gradient estimation means for estimating a gradient of a certain point within the predetermined interval or an average gradient of a certain interval within the predetermined interval, based on the average gradient information acquired by the average gradient information acquisition means and the driving status information of the host vehicle that is acquired by the driving status information acquisition means, and performs driving assistance in the predetermined interval, using the gradient that is estimated by the gradient estimation means.

12 Claims, 8 Drawing Sheets

(56) References Cited

U.S. PATENT DOCUMENTS

| | | | |
|---|---|---|---|
| 2008/0208459 A1* | 8/2008 | Takahata et al. | 701/208 |
| 2010/0010697 A1* | 1/2010 | Soma et al. | 701/22 |
| 2010/0019933 A1* | 1/2010 | Aono | 340/905 |
| 2010/0121590 A1* | 5/2010 | Kato | 702/63 |
| 2010/0256848 A1* | 10/2010 | Sasaki et al. | 701/22 |
| 2010/0324752 A1* | 12/2010 | Suganuma et al. | 701/1 |

FOREIGN PATENT DOCUMENTS

| | | |
|---|---|---|
| JP | 2006 35928 | 2/2006 |
| JP | 2007 221889 | 8/2007 |
| JP | 2008-74337 | 4/2008 |
| JP | 2010-25598 A | 2/2010 |
| JP | 2010 115053 | 5/2010 |
| JP | 2010 179803 | 8/2010 |
| JP | 2011-952 A | 1/2011 |

* cited by examiner (a)

(b)

DRIVE ASSIST APPARATUS, AND INFORMATION PROCESSING APPARATUS FOR VEHICLES

TECHNICAL FIELD

The present invention relates to a drive assist apparatus and an information processing apparatus for vehicles, which perform appropriate driving assistance in a predetermined interval having a gradient.

BACKGROUND ART

Various technologies for assisting drivers of vehicles are developed, and as an example thereof, deceleration stop assistance is performed when a vehicle stops at a red signal at an intersection. When the deceleration stop assistance is performed, if there is a gradient in an assistance object interval in front of the intersection, the gravitational acceleration acts on the vehicle according to the gradient, and thus appropriate driving assistance is not possible without considering the gradient. Therefore, the drive assist apparatus disclosed in Patent Literature 1 performs an alert and a brake assist control as driving assistance according to signal cycle information received from a road-side apparatus (an infrastructure), and changes a start-up condition of driving assistance, based on the gradient information received from the road-side apparatus.

CITATION LIST

Patent Literature

[Patent Literature 1] Japanese Unexamined Patent Application Publication No. 2010-179803
[Patent Literature 2] Japanese Unexamined Patent Application Publication No. 9-166209
[Patent Literature 3] Japanese Unexamined Patent Application Publication No. 2007-221889

SUMMARY OF INVENTION

Technical Problem

In a case of providing gradient information from an infrastructure as described above, it is considered to provide an average gradient of a service area of the infrastructure, because there is a limit to the available amount of information. As illustrated in FIG. 8(a), when a gradient of a service area A1 before an intersection is uniform, there is no difference between an average gradient from the infrastructure and an actual gradient. However, as illustrated in FIG. 8(b), when there is a gradient change point in a service area A2 before an intersection (in a case of this example, there is a change point changing from a downward gradient to an upward gradient), there is a difference between the average gradient from the infrastructure and the actual gradient. If driving assistance is performed based on the average gradient from the infrastructure, appropriate driving assistance is not possible. In a case of an example of FIG. 8, if it is assumed that the average gradient of the service area A1 before the intersection in FIG. 8(a) and the average gradient of the service area A2 before the intersection (a gradient of a downward slope indicated by a broken line) in FIG. 8(b) are the same, in deceleration stop assistance based on the average gradient, display to induce an accelerator OFF at the same locations P1 and P2 is performed. Accordingly, because an interval from a position P2 to a stop position is an upward slope in a case of FIG. 8(b), a vehicle cannot reach a stop position after the accelerator OFF, and thereby it is necessary to be re-accelerated by the accelerator ON.

Accordingly, an object of the present invention is to provide a drive assist apparatus and an information processing apparatus for vehicles, which perform appropriate driving assistance in a predetermined interval that has a gradient with a change point.

Solution to Problem

A drive assist apparatus according to the present invention is a drive assist apparatus which performs driving assistance in a predetermined interval having a gradient, includes average gradient information acquisition means for acquiring average gradient information of the predetermined interval, driving status information acquisition means for acquiring driving status information of a host vehicle, and gradient estimation means for estimating a gradient of a certain point within the predetermined interval or an average gradient of a certain interval within the predetermined interval, based on the average gradient information acquired by the average gradient information acquisition means and the driving status information of the host vehicle that is acquired by the driving status information acquisition means, and performs driving assistance in the predetermined interval, using the gradient that is estimated by the gradient estimation means.

The drive assist apparatus acquires the average gradient information of the predetermined interval by the average gradient information acquisition means. Further, the drive assist apparatus acquires the driving status information of the host vehicle by the driving status information acquisition means. The driving status information of the host vehicle is various types of information necessary for estimating the gradient of the predetermined interval, including for example, a longitudinal acceleration, an altitude, a moving distance, a vehicle speed, and a present position. Then, the drive assist apparatus estimates the gradient of the certain point within the predetermined interval or the average gradient of the certain interval within the predetermined interval, based on the average gradient information of the predetermined interval and the driving status information of the host vehicle, by the gradient estimation means and performs driving assistance in the predetermined interval using the estimated gradient of the certain point and the estimated average gradient of the certain interval. In this manner, by estimating the gradient of the certain point within the predetermined interval or the average gradient of the certain interval based on the average gradient information of the predetermined interval and the driving status information of the host vehicle, when there is a change point in a gradient, the drive assist apparatus can estimate with high precision, the gradient at the certain point or at the certain interval before and after the change point and perform appropriate driving assistance using the very precise gradient that is estimated (a gradient being closer to an actual gradient). In addition, the change point of the gradient may be a point where a gradient changes by more than a predetermined amount in gradient, as well as a point where a sign of a gradient changes (that is, the point where the gradient changes from an upward gradient to a downward gradient, or the point where the gradient changes from a downward gradient to an upward gradient).

The drive assist apparatus of the present invention may have an configuration in which the driving status information acquisition means acquires a longitudinal acceleration of the host vehicle, and the gradient estimation means may estimate the gradient of the certain point within the predetermined interval or the average gradient of the certain interval within the predetermined interval, based on the average gradient information acquired by the average gradient information acquisition means and the longitudinal acceleration of the host vehicle that is acquired by the driving status information acquisition means.

The drive assist apparatus acquires the longitudinal acceleration of the host vehicle, by the driving status information acquisition means. The longitudinal acceleration of the host vehicle includes a change in a vehicle speed of a host vehicle (acceleration) and gravitational acceleration acting on the host vehicle if the host vehicle travels on a sloping road, and thus becomes important information in order to estimate the gradient. Therefore, the drive assist apparatus estimates the gradient of the certain point within the predetermined interval or the average gradient of the certain interval within the predetermined interval, based on the average gradient information of the predetermined interval and the longitudinal acceleration of the host vehicle, by the gradient estimation means. In this manner, the drive assist apparatus can estimate with higher precision, the gradient of the certain point or the average gradient of the certain interval within the predetermined interval, using the longitudinal acceleration of the host vehicle in addition to the average gradient information of the predetermined interval.

In the drive assist apparatus of the present invention, the gradient estimation means estimates an average gradient from a starting end position of a predetermined interval to a present position. Further, in the drive assist apparatus of the present invention, the gradient estimation means estimates an average gradient from the present position to a terminating end position of the predetermined interval, based on the average gradient information acquired by the average gradient information acquisition means and the average gradient from the starting end position of the predetermined interval to the present position. In this manner, the drive assist apparatus can estimate with higher accuracy, an average gradient in the following interval from a present position within a predetermined interval, using a longitudinal acceleration of the host vehicle in addition to average gradient information of the predetermined interval.

The drive assist apparatus of the present invention may further include change point gradient information acquisition means for acquiring gradient information up to a change point within a predetermined interval, and may have a configuration in which the driving status information acquisition means acquires a present position of the host vehicle, and the gradient estimation means estimates the gradient of the certain point within the predetermined interval or the average gradient of the certain interval within the predetermined interval, based on the average gradient information acquired by the average gradient information acquisition means, the present position of the host vehicle that is acquired by the driving status information acquisition means, and the gradient information up to the change point acquired by the change point gradient information acquisition means.

In the drive assist apparatus, the change point gradient information acquisition means acquires gradient information up to the change point within a predetermined interval. The gradient information up to the change point includes, for example, average gradient information up to the change point, an altitude difference up to the change point necessary for calculating an average gradient up to the change point, and a distance difference. In addition, the gradient information up to the change point includes gradient information from a starting end position of a predetermined interval to the change point, gradient information between change points, and gradient information from the change point to the terminating end position of a predetermined interval. Further, in the drive assist apparatus, the driving status information acquisition means acquires a present position of the host vehicle. Then, the drive assist apparatus estimates the gradient of the certain point within the predetermined interval or the average gradient of the certain interval within the predetermined interval, based on the average gradient information of the predetermined interval, the present position of the host vehicle, and the gradient information up to the change point, and performs driving assistance using the gradient according to the present position. In this manner, the drive assist apparatus can estimate the gradient of the certain point within the predetermined interval or the average gradient of the certain interval within the predetermined interval with higher accuracy, using gradient information up to the change point in addition to the average gradient information of the predetermined interval.

The drive assist apparatus of the present invention determines a timing of acceleration and deceleration in a predetermined interval using a gradient estimated by the gradient estimation means. In this manner, the drive assist apparatus can determine with high accuracy, a timing (a time, a location, and the like) of acceleration and deceleration of driving assistance, using the gradient at the certain point within the predetermined interval or the average gradient in the certain interval that is estimated with high accuracy as described above.

An information processing apparatus for vehicles according to the present invention includes average gradient information acquisition means for acquiring average gradient information of a predetermined interval, driving status information acquisition means for acquiring the driving status information of a host vehicle, and gradient estimation means for estimating a gradient of a certain point within a predetermined interval or an average gradient of a certain interval within a predetermined interval, based on the average gradient information acquired by the average gradient information acquisition means and the driving status information of the host vehicle that is acquired by the driving status information acquisition means.

In the information processing apparatus for vehicles of the present invention, the driving status information acquisition means may acquire a longitudinal acceleration of the host vehicle, and the gradient estimation means may estimate the gradient of the certain point within the predetermined interval or the average gradient of the certain interval within the predetermined interval, based on the average gradient information acquired by the average gradient information acquisition means and the longitudinal acceleration of the host vehicle that is acquired by the driving status information acquisition means.

In the information processing apparatus for vehicles of the present invention, the gradient estimation means estimates an average gradient from a starting end position of a predetermined interval to a present position. Further, in the information processing apparatus for vehicles of the present invention, the gradient estimation means estimates an average gradient from the present position to a terminating end position of the predetermined interval, based on the average gradient information acquired by the average gradient information acquisition means and the average gradient from the starting end position of the predetermined interval to the present position.

The information processing apparatus for vehicles of the present invention further includes change point gradient information acquisition means for acquiring gradient information up to a change point within a predetermined interval, the driving status information acquisition means acquires a present position of the host vehicle, and the gradient estimation means estimates the gradient of the certain point within the predetermined interval or the average gradient of the certain interval within the predetermined interval, based on the average gradient information acquired by the average gradient information acquisition means, the present position of the host vehicle that is acquired by the driving status information acquisition means, and the gradient information up to the change point acquired by the change point gradient information acquisition means.

Similar to each drive assist apparatus, each information processing apparatus for vehicles can estimate with high precision, a gradient at a certain point or at a certain interval before and after a change point, in a case of a gradient with the change point.

Advantageous Effects of Invention

According to the present invention, in a case of a gradient with a change point, it is possible to estimate with high precision a gradient at a certain point or at a certain interval before and after the change point, and to perform appropriate driving assistance using the precise gradient that is estimated, by estimating a gradient of a certain point or an average gradient of a certain interval within a predetermined interval, based on average gradient information of the predetermined interval and driving status information of a host vehicle.

DESCRIPTION OF EMBODIMENTS

Figure 1:
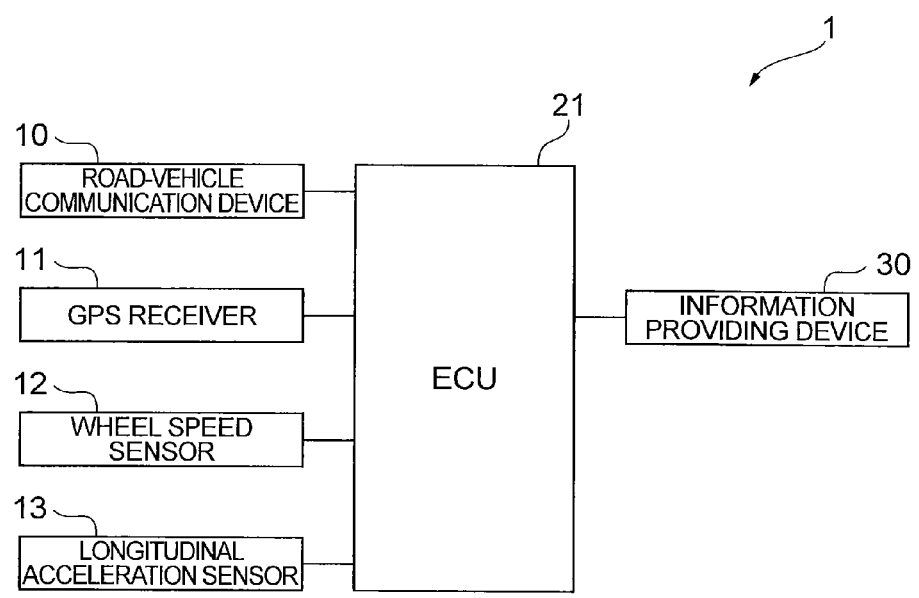
FIG. 1 is a configuration diagram of an infrastructure cooperative system according to a first embodiment

Hereinafter, embodiments of a drive assist apparatus and an information processing apparatus for vehicles according to the present invention will be described with reference to the drawings. Further, the same reference numerals are given to the same or corresponding components in each drawing, so the description thereof will be omitted.

In the present embodiment, the present invention is applied to an infrastructure cooperative system mounted on vehicles with an eco-driving assistance function. The infrastructure cooperative system according to the present embodiment receives infrastructure information from a road-side device of the infrastructure and performs various types of driving assistance in cooperation with the infrastructure. In the present embodiment, as an example of eco-driving assistance by infrastructure cooperation, eco-driving assistance (assisting a driver in driving in a fuel efficient manner), that is applied when a vehicle decelerates and stops at a red signal at an intersection, will be described in detail. In the eco-driving assistance, the driver is notified of an accelerator OFF timing at which the vehicle can approach to a stop position at an appropriate speed with a Human Machine Interface (HMI), such that sudden brake or re-acceleration is not applied when the vehicle stops at the stop position. Particularly, in the present embodiment, deceleration stop assistance which is suitable for a case where there is a gradient in a service area of the infrastructure and the gradient has a change point will be described.

In addition, although being not particularly limited, for example, a hybrid vehicle, an electric vehicle, and an engine vehicle can be applied to the vehicle. A road-side device of the infrastructure includes, for example, a radio wave beacon and an optical beacon. A service area is defined in the infrastructure, and for example, an interval from an intersection (specifically, a stop position) that is an assistance object to 200 m is a service area before an intersection (cases other than 200 m are possible depending on an intersection). The radio wave beacon is installed at the intersection, or the like. After infrastructure information is received from the radio wave beacon, it is determined whether the vehicle enters a service area by comparing a start position of a service area with a present position of a vehicle. The optical beacon is installed above a lane of a start position of a service area. When infrastructure information has been received from the optical beacon, it is recognized that the vehicle enters a service area. Infrastructure information includes average gradient information of the service area before the intersection, and deceleration stop assistance is performed using the average gradient information. In the present embodiment, an estimation method of an average gradient of an interval within a service area has two different types. An estimation method of a type according to a first embodiment performs an estimation using a longitudinal acceleration of a vehicle, and an estimation method of a type according to a second embodiment performs an estimation using additional information of infrastructure information.

Figure 2:
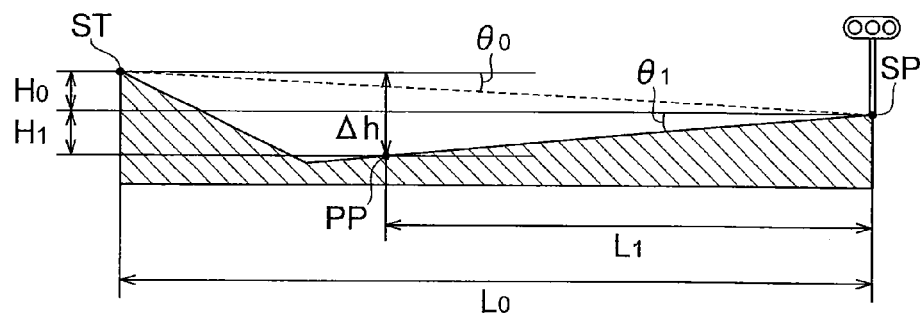
FIG. 2 is an example of a service area before an intersection that has a gradient (a case where there is a gradient change point being downwardly convex).
Figure 3:
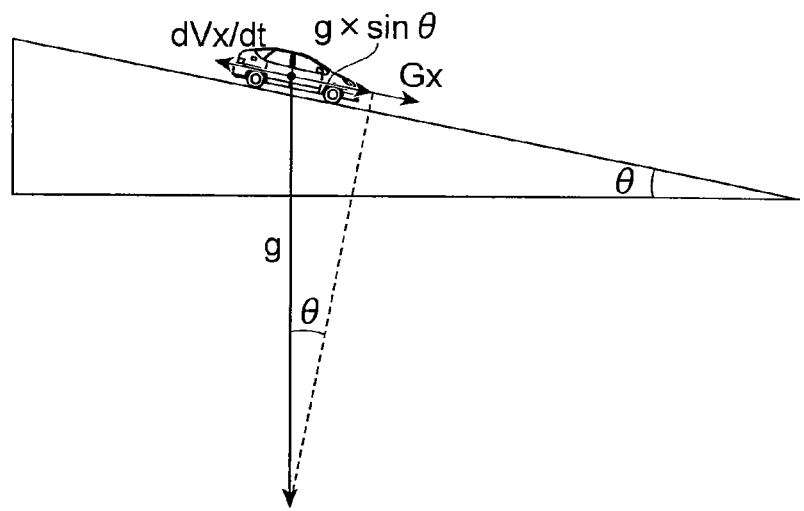
FIG. 3 is an explanatory view of a gradient estimation method according to the first embodiment.

With reference to FIGS. 1 to 3, an infrastructure cooperative system 1 according to the first embodiment will be described. FIG. 1 is a configuration diagram of the infrastructure cooperative system according to the first embodiment. FIG. 2 is an example of a service area before an intersection that has a gradient (a case where there is a gradient change point that is downwardly convex). FIG. 3 is an explanatory view of a gradient estimation method according to the first embodiment.

The infrastructure cooperative system 1 receives infrastructure information by road-vehicle communication, and when it is predicted that the vehicle cannot pass through an intersection at a red signal, the infrastructure cooperative system 1 determines using the infrastructure information, the accelerator OFF timing at which the vehicle can stop at a stop position with low fuel consumption and notifies the driver of the accelerator OFF timing. Specially, the infrastructure cooperative system 1 uses a longitudinal acceleration that is detected in the vehicle in addition to average gradient information included in the infrastructure information, in order to determine a very precise accelerator OFF timing even in a service area before an intersection that has a gradient with a change point.

The infrastructure cooperative system 1 includes a road-vehicle communication device 10, a Global Positioning System (GPS) receiver 11, a wheel speed sensor 12, a longitudinal acceleration sensor 13, an Electronic Control Unit (ECU) 21, and an information providing device 30. In addition, in the first embodiment, the road-vehicle communication device 10 corresponds to average gradient information acquisition means described in the claims, the longitudinal acceleration sensor 13 corresponds to driving status information acquisition means described in the claims, and the processing in the ECU 21 corresponds to gradient estimation means described in the claims.

The road-vehicle communication device 10 is a device for road-vehicle communication with a road-side device of the infrastructure. In the road-vehicle communication device 10, if the vehicle enters the communication area from the road-side device, the vehicle receives the infrastructure information from the road-side device and transmits the received infrastructure information to the ECU 21. Information used by the ECU 21 among infrastructure information includes for example, road alignment information (node information and link information) within an intersection service area, information at an intersection that is a service object (for example, positional information of a stop position), signal cycle information, and average gradient information of a service area before an intersection.

In addition, the average gradient of a service area before an intersection, as shown in FIG. 2, an altitude difference $H_0$ between a start position ST and a stop position SP of a service area before an intersection/a distance $L_0$ between a start position ST and a stop position SP (if an average gradient angle of the gradient is $\theta_0$, tan $\theta_0$ is an average gradient), and a unit thereof is [%]. A length of a service area before an intersection (distance between the start position ST and the stop position SP) $L_0$ can be obtained using link information. The start position ST of the service area before the intersection can be obtained from positional information of a stop position SP and a length $L_0$ of the service area before the intersection.

The GPS receiver 11 includes a GPS antenna, a processing device, and the like, and detects a present position of a vehicle, and the like. In the GPS receiver 11, the GPS antenna receives GPS signals from GPS satellites. Then, in the GPS receiver 11, the processing device demodulates the GPS signals, and estimates the present position (latitude and longitude) and the like of the vehicle based on the demodulated positional data of each GPS satellite. Then, the GPS receiver 11 outputs present position information to the ECU 21. In case the road side device of the infrastructure is an optical beacon, it is recognized that the vehicle enters a service area before an intersection when infrastructure information has been received from the optical beacon, and thus the GPS receiver 11 (also present position information) is not needed. Moreover, when a navigation system is mounted on a vehicle, a GPS receiver of the navigation system is shared, or a present position is acquired from a navigation system.

The wheel speed sensor 12 is a sensor that is provided in each of wheels of a vehicle, and detects a rotational speed of the wheel. The wheel speed sensor 12 of each wheel detects a wheel speed and outputs the detected wheel speed to the ECU 21. In addition, the ECU 21 estimates a vehicle speed Vx from the wheel speed of each wheel.

The longitudinal acceleration sensor 13 is a sensor that detects an acceleration acting on the vehicle in the longitudinal direction. The longitudinal acceleration sensor 13 detects the longitudinal acceleration, and outputs the detected longitudinal acceleration information to the ECU 21. In addition, the longitudinal acceleration is represented by a positive value/a negative value, the positive value is acceleration in a forward direction, and the negative value is acceleration (that is, deceleration) in a backward direction.

The ECU 21 is an electronic control unit configured by a Central Processing Unit (CPU), a Read Only Memory (ROM), a Random Access Memory (RAM), and the like, and performs an overall control of the infrastructure cooperative system 1. ECU 21 acquires infrastructure information from the road-vehicle communication device when the road-vehicle communication device 10 receives infrastructure information. Further, the ECU 21 receives at regular time intervals, information from each of the GPS receiver 11, the wheel speed sensor 12, and the longitudinal acceleration sensor 13. Then, the ECU 21 acquires infrastructure information, and when the host vehicle enters a service area before an intersection, the ECU 21 performs a deceleration stop assistance control using the acquired information. When the host vehicle determines an accelerator OFF timing when the vehicle stops at a red signal at an intersection, the ECU 21 outputs an instruction to induce an accelerator OFF to the information providing device 30. A specific process in the ECU 21 will be described later.

If acquiring infrastructure information from the road-vehicle communication device 10, the ECU 21 determines that there is reception from the infrastructure, and determines whether the host vehicle enters a service area before an intersection. This determination is carried out by comparing the present position information from the GPS receiver 11 and the positional information of the start position ST of a service area before an intersection that is obtained from the infrastructure information. In addition, when the infrastructure (road-side device) is an optical beacon, it is determined that the host vehicle enters the service area before the intersection at the time when it is determined that there is a reception from the infrastructure.

If infrastructure information is acquired and the host vehicle enters the service area before the intersection, the ECU 21 using the length of the service area before the intersection $L_0$ and an average gradient tan $\theta_0$ that are included in the infrastructure information, calculates a relative height (altitude difference) $H_0$ from the start position ST to the stop position SP of the service area before the intersection by expression (1) (see FIG. 2). In addition, the ECU 21 calculates a vehicle speed Vx of the host vehicle at the present position (current time) using a wheel speed of each wheel from the wheel speed sensor 12, at regular time intervals. In addition, the ECU 21 calculates a remaining distance $L_1$ from a present position PP to a stop position SP at a regular time intervals, using a length $L_0$ of a service area before an intersection included in the infrastructure information and a travel distance from a start position ST to present position PP (see FIG. 2). The travel distance from the start position ST to the present position PP is obtained by integrating a vehicle speed Vx at each position (each time) after the vehicle enters a service area before an intersection. Then, the ECU 21 calculates an average gradient tan $\theta_1$ from a present position PP to a stop position SP using an average gradient tan $\theta_0$ of a service area before an intersection, a vehicle speed Vx at each position (each time), and a longitudinal acceleration Gx (see FIG. 2).

[Equation 1]

$$H_0 = L_0 \times \tan \theta_0 \qquad (1)$$

A method of calculating the average gradient tan $\theta_1$ from a present position PP to a stop position SP will be described in detail with reference to FIG. 2 and FIG. 3. g shown in FIG. 3 is a gravitational acceleration, and g×Sin θ is applied in a longitudinal direction by the vehicle. dVx/dt shown in FIG. 3 is a change in a vehicle speed Vx of the vehicle, and an example of FIG. 3 shows a case of deceleration. Gx shown in FIG. 3 is a longitudinal acceleration that is detected in the longitudinal acceleration sensor 13. The relationship between g×Sin θ, dVx/dt and Gx is shown by expression (2). By changing expression (2), Sin θ can be calculated by expression (3).

[Equation 2]

$$Gx = \frac{dVx}{dt} + g \times \sin\theta \qquad (2)$$

$$\sin\theta = \frac{Gx - \frac{dVx}{dt}}{g} \qquad (3)$$

If an average value from the start position ST to the present position PP of the service area before the intersection of Sin θ is assumed to be Sin θ(ave) and the travel distance from the start position ST to the present position PP is assumed to be L, a height change amount (altitude difference) Δh from the start position ST to the present position PP can be calculated by expression (4). Sin θ (ave) can be calculated by expression (5), using an average value Gx (ave) of a longitudinal acceleration Gx from the start position ST to the present position PP, and the average value dVx/dt (ave) of the vehicle speed change dVx/dt from the start position ST to the present position PP. If it is assumed that K pieces of Gx(0), Gx(1), Gx(2), . . . , and Gx(K−1) are obtained from the start position ST to the present position PP, Gx(ave) can be calculated by expression (6). If it is assumed that K pieces of dVx/dt(0), dVx/dt(1), dVx/dt(2), . . . , and dVx/dt(K−1) are obtained, dVx/dt(ave) from the start position ST to the present position PP can be calculated by expression (7). Accordingly, ECU 21 calculates Gx(ave) by expression (6) at regular time intervals using the longitudinal acceleration Gx and the vehicle speed Vx at each position (each time) after the vehicle enters the service area before the intersection, calculates dVx/dt(ave) by expression (7), calculates Sin θ(ave) by expression (5) using the Gx(ave) and the dVx/dt(ave), and calculates the height change amount (altitude difference) Δh from the start position ST to the present position PP by expression (4) using the Sin θ(ave).

[Equation 3]

$$\Delta h = L \times \sin\theta(ave) \qquad (4)$$

$$\sin\theta(ave) = \frac{Gx(ave) - \frac{dVx}{dt}(ave)}{g} \qquad (5)$$

$$Gx(ave) = \frac{Gx(0) + Gx(1) + Gx(2) + \ldots + Gx(K-1)}{K} \qquad (6)$$

$$\frac{dVx}{dt}(ave) = \frac{\frac{dVx}{dt}(0) + \frac{dVx}{dt}(1) + \frac{dVx}{dt}(2) + \ldots + \frac{dVx}{dt}(K-1)}{K} \qquad (7)$$

As illustrated in FIG. 2, a relative height $H_1$ from the present position to the stop position SP is needed in addition to the remaining distance $L_1$ from the present position PP to the stop position SP, in order to obtain the average gradient tan $\theta_1$ from the present position PP to the stop position SP. Incidentally, ECU 21 calculates the relative height (altitude difference) $H_1$ from the present position PP to the stop position SP by expression (8) using the height change amount Δh from the start position ST to the present position PP (that is, a relative height from the start position ST to the present position PP) and the relative height $H_0$ from the start position ST to the stop position SP.

[Equation 4]

$$H_1 = H_0 - \Delta h \qquad (8)$$

Then, the ECU 21 calculates the average gradient tan $\theta_1$ from the present position PP to the stop position SP by expression (9), using the remaining distance $L_1$ from the present position PP to the stop position SP and the relative height $H_1$ from the present position PP to the stop position SP.

[Equation 5]

$$\tan\theta_1 = \frac{H_1}{L_1} \qquad (9)$$

Further, the ECU 21 calculates a deceleration a at the time of accelerator OFF. The deceleration a at the time of accelerator OFF is a deceleration due to deceleration by a road surface resistance, deceleration by an engine brake in an engine driven vehicle, or deceleration by a regeneration brake in a motor driven vehicle. The deceleration by a road surface resistance is calculated from a road surface friction coefficient. Further, the deceleration by the engine brake or the deceleration by the regeneration brake is calculated according to the vehicle speed using a map or the like. Further, general methods are applied to a specific method of calculating the deceleration a.

Further, the ECU 21 calculates a remaining time $T_1$ of a blue signal based on signal cycle information included in the infrastructure information. In addition, general methods are applied to a specific method of calculating the remaining time $T_1$ of the blue signal.

Then, in order for the ECU 21 to determine whether the host vehicle can pass through the intersection that is an assistance object at a blue signal or the host vehicle needs to stop at a red signal (including a yellow signal), the ECU 21 determines whether the remaining time $T_1$ of the blue signal is shorter than the remaining distance $L_1$/the vehicle speed Vx, using the remaining time $T_1$ of the blue signal, the remaining distance $L_1$ from the present position PP to the stop position SP, and the vehicle speed Vx in the present position PP. Other methods may be applied to the determination method. When the remaining time $T_1$ of the blue signal is equal to or more than the remaining distance $L_1$/the vehicle speed Vx and thus the host vehicle can pass through the intersection in the blue signal, it is not necessary to perform deceleration stop assistance.

When the remaining time $T_1$ of the blue signal is shorter than the remaining distance $L_1$/the vehicle speed Vx and thus the host vehicle needs to stop at the intersection at the red signal, the ECU 21 calculates a deceleration start position (accelerator OFF timing) $L_{limit}$ by expression (10) using vehicle speed Vx at the present position PP and the deceleration θ at the time of accelerator OFF and average gradient tan $\theta_1$. Other methods may be applied to the method of calculating the assist timing. Then, the ECU 21 generates an image signal or an audio signal for the driver to induce the accelerator OFF at the deceleration start position $L_{limit}$, using the deceleration start position $L_{limit}$, and transmits a display signal for displaying the image or an audio signal for outputting the audio to an information providing device 30.

[Equation 6]

$$L_{limit} = \frac{Vx^2}{2 \times (a - \tan\theta_1)} \quad (10)$$

The information providing device 30 is a device to be used when information on driving assistance for the driver is provided, and includes a display, a speaker, or the like. The display is a vehicle-mounted display that is shared by various systems. When receiving a display signal from the ECU 21, the display displays an image according to the display signal. The speaker is a vehicle-mounted speaker that is shared by various systems. When receiving an audio signal from the ECU 21, the speaker outputs an audio according to the audio signal.

Figure 4:
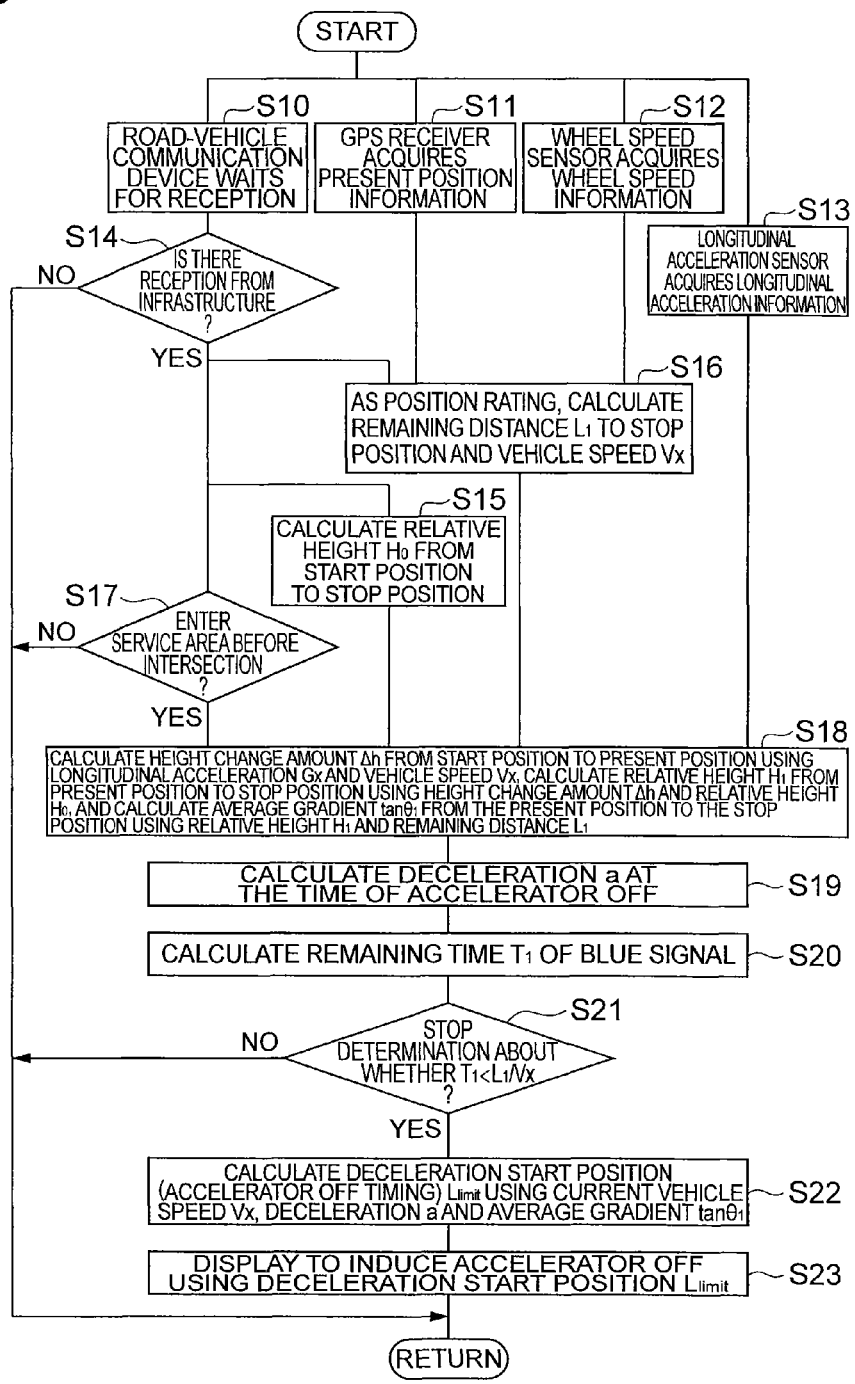
FIG. 4 is a flowchart showing a flow of deceleration stop assistance according to the first embodiment.

With reference to FIGS. 1 to 3, an operation of deceleration stop assistance in the infrastructure cooperative system 1 will be described according to the flowchart of FIG. 4. FIG. 4 is a flowchart showing a flow of deceleration stop assistance according to the first embodiment.

The road-vehicle communication device 10 waits to receive the infrastructure information from the road-side device of the infrastructure (S10). If the vehicle enters within a communication area of a road-side device of the infrastructure, the road-vehicle communication device 10 receives the infrastructure information from the road-side device of the infrastructure and outputs the infrastructure information to the ECU 21. The GPS receiver 11 receives a GPS signal from each GPS satellite, calculates a present position and the like using the GPS signal that is received at regular time intervals, and outputs present position information and the like to the ECU 21 (S11). The ECU 21 acquires present position information at regular time intervals (S11). The wheel speed sensor 12 of each wheel detects a wheel speed at regular time intervals, and outputs wheel speed information to the ECU 21 (S12). The ECU 21 acquires the wheel speed information of each wheel at regular time intervals (S12). The longitudinal acceleration sensor 13 detects a longitudinal acceleration of a vehicle at regular time intervals and outputs longitudinal acceleration information to the ECU 21 (S13). The ECU 21 acquires the longitudinal acceleration information at regular time intervals (S13).

The ECU 21 determines at regular time intervals whether there is a reception from the infrastructure, based on presence or absence of the infrastructure information from the road-vehicle communication device 10 (S14). When it is determined that there is no reception from the infrastructure in the determination of S14, the ECU 21 does not perform eco-driving assistance of infrastructure cooperation, and thus the present process is ended.

When it is detected that there is a reception from the infrastructure in the determination of S14, the ECU 21 calculates the relative height $H_0$ from the start position ST to the stop position SP of the service area before the intersection using the length $L_0$ and the average gradient $\tan\theta_0$ of the service area before the intersection of the infrastructure information (S15). Further, the ECU 21 calculates as the position rating, the vehicle speed Vx of the host vehicle using wheel speed of each wheel and the remaining distance $L_1$ from the present position PP to the stop position SP, using the length $L_0$ of the service area before the intersection and the travel distance from the start position ST to the present position PP of the infrastructure information (S16).

The ECU 21 determines whether the host vehicle enters the service area before the intersection (S17). When it is determined that the host vehicle does not enter the service area before the intersection in S17, the ECU 21 ends the present processing because the area is an area other than the eco-driving assistance object. In addition, in case that road side device of the infrastructure is an optical beacon, it is recognized that the vehicle enters the service area before the intersection at the time when infrastructure information is received from the optical beacon. Therefore, if the infrastructure road-side device performs the determination of S14, it is not necessary to perform the determination of S17.

When it is determined that the host vehicle enters the service area before the intersection in S17, the ECU 21 calculates the height change amount Ah from the start position ST to the present position PP by expressions (4) to (7), using the longitudinal acceleration Gx that is detected at regular time intervals and the vehicle speed Vx that is calculated at regular time intervals after the vehicle enters the service area before the intersection (S18). Then, the ECU 21 calculates the relative height $H_1$ from the present position PP to the stop position SP by expression (8), using the height change amount Ah and the relative height $H_0$ (S18). Further, the ECU 21 calculates the average gradient $\tan\theta_1$ from the present position PP to the stop position SP by expression (9) using the relative height $H_1$ and the remaining distance $L_1$ (S18).

The ECU 21 calculates the deceleration a at the time of accelerator OFF using the current vehicle speed Vx, the road surface friction coefficient, and the like (S19). Further, the ECU 21 calculates the remaining time $T_1$ of the blue signal at the intersection that is an assistance object using the signal cycle information of the infrastructure information (S20). Then, the ECU 21 determines whether the remaining time $T_1$ of the blue signal is shorter than the remaining distance $L_1$/the vehicle speed Vx in order to determine whether the host vehicle needs to stop in a red signal of the intersection that is the assistance object (S21). When it is determined in S21 that the remaining time $T_1$ of the blue signal is equal to or more than the remaining distance $L_1$/the vehicle speed Vx, the host vehicle can pass through the intersection that is the assistance object at a blue signal, and thus the ECU 21 ends the present process.

When it is determined in S21 that the remaining time $T_1$ of the blue signal is shorter than the remaining distance $L_1$/the vehicle speed Vx, the ECU 21 calculates a deceleration start position (accelerator OFF timing) $L_{limit}$ by expression (10) using the current vehicle speed Vx and the deceleration a and the average gradient $\tan\theta_1$ (S22). Then, the ECU 21 transmits a display signal or an audio signal for the driver to induce the accelerator OFF at the deceleration start position $L_{limit}$, using the deceleration start position $L_{limit}$ to the information providing device 30 (S23). When receiving a display signal, the information providing device 30 displays an image to induce the accelerator OFF at the deceleration start position $L_{limit}$, according to the display signal (S23). Further, when receiving an audio signal, the information providing device 30 outputs an audio to induce the accelerator OFF at the deceleration start position $L_{limit}$, according to the audio signal (S23). Depending on the image and audio, the driver turns off the accelerator around the deceleration start position $L_{limit}$. Then, even if there is a change point in the gradient, the vehicle can stop at the stop position of the intersection that is an assistance object, while sudden brake or re-acceleration is not applied.

According to the infrastructure cooperative system 1, the average gradient from the present position to the stop position is estimated based on the average gradient of the service area before the intersection, the longitudinal acceleration of the host vehicle and the vehicle speed. Therefore, even in a gradient having the change point, it is possible to estimate with high accuracy the average gradient from the present position to the stop position and to perform appropriate deceleration stop assistance using the very precise average gradient that is estimated (the gradient more closer to the actual gradient). In this case, when the vehicle cannot pass through the intersection at a red signal, it is possible to obtain an appropriate deceleration stop position using the very precise average gradient that is estimated. The accelerator OFF is induced using the deceleration stop position, it is possible for the vehicle to smoothly stop at the stop position while sudden brake or re-acceleration is not applied. In this manner, appropriate assistance is possible with respect to the service area before the intersection including the gradient having the change point, and thus an opportunity in which eco-driving assistance is established at the time of deceleration stop is increased.

Particularly, according to the infrastructure cooperative system 1, the height change amount (altitude difference) from the start position to the present position is obtained using the longitudinal acceleration and the vehicle speed of the host vehicle at each position (each time) from the start position to the present position, thereby it is possible to correct the average gradient of the service area before the intersection using the height change amount, and to estimate the average gradient in an interval from the present position to the stop position with high accuracy.

Figure 5:
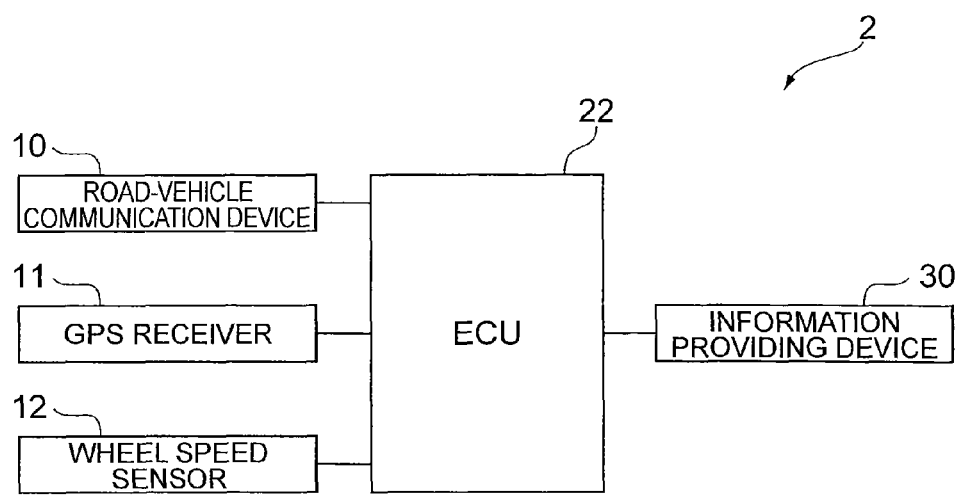
FIG. 5 is a configuration diagram of an infrastructure cooperative system according to a second embodiment.
Figure 6:
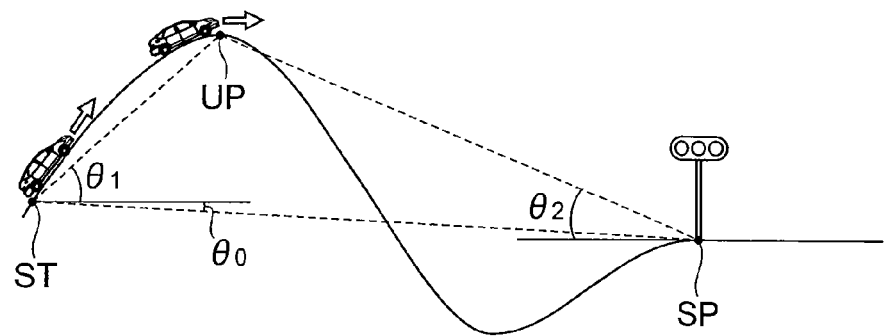
FIG. 6 is an example of a service area before an intersection that has a gradient (a case where there are a gradient change point being downwardly convex and a gradient change point being upwardly convex).

With reference to FIGS. 5 and 6, an infrastructure cooperative system 2 according to a second embodiment will be described. FIG. 5 is a configuration diagram of the infrastructure cooperative system according to the second embodiment. FIG. 6 is an example of a service area before an intersection having a gradient (a case where there is a gradient change point being downwardly convex and a gradient change point being upwardly convex).

Comparing with the infrastructure cooperative system 1 according to the first embodiment, the infrastructure cooperative system 2 is different from the infrastructure cooperative system 1 in that the infrastructure cooperative system 2 uses average gradient information of a service area before an intersection included in infrastructure information and average gradient information up to an upwardly convex gradient change point such that the infrastructure cooperative system 2 determines a very precise accelerator OFF timing even in the service area before the intersection that has a gradient with a change point (particularly, upwardly convex change point).

The infrastructure cooperative system 2 includes a road-vehicle communication device 10, a GPS receiver 11, a wheel speed sensor 12, an ECU 22, and an information providing device 30. In addition, in the second embodiment, the road-vehicle communication device 10 corresponds to average gradient information acquisition means and change point gradient information acquisition means that are described in the claims, the GPS receiver 11 corresponds to driving status information acquisition means described in the claims, and the process of the ECU 22 corresponds to gradient estimation means described in the claims.

The road-vehicle communication device 10, the GPS receiver 11, the wheel speed sensor 12, and the information providing device 30 are the same as those described in the first embodiment, and thus the description thereof will be omitted. However, average gradient information up to the upwardly convex gradient change point is included in the infrastructure information received by the road-vehicle communication device 10, as additional information. In an example illustrated in FIG. 6, an average gradient $\tan\theta_1$ from the start position ST to the upwardly convex gradient change point UP is included as additional information in the infrastructure information, in addition to the average gradient $\tan\theta_0$ from the start position ST to the stop position SP of the service area before the intersection.

In addition, as shown in FIG. 6, when there is an upwardly convex gradient within the service area before the intersection, but only the average gradient $\tan\theta_0$ of the service area before the intersection is used as the deceleration stop assistance of the related art, if it is assumed that the deceleration stop position is determined in front of the upwardly convex gradient change point UP, there is a possibility that the vehicle speed becomes 0 in the middle of an upward slope. In this case, re-acceleration is needed. Accordingly, in order to determine a deceleration stop position such that the vehicle speed up to the apex of the upward slope (gradient change point UP) does not become 0, the average gradient $\tan\theta_1$ up to the apex of the upward slope is important.

An ECU 22 is an electronic control unit configured by a CPU, a ROM, a RAM, and the like, and performs overall control of the infrastructure cooperative system 2. ECU 22 acquires infrastructure information from the road-vehicle communication device 10 when the road-vehicle communication device 10 receives infrastructure information. Further, the ECU 22 receives information from each of the GPS receiver 11 and the wheel speed sensor 12, at regular time intervals. Then, the ECU 22 acquires infrastructure information. When the host vehicle enters a service area before an intersection, the ECU 22 performs a deceleration stop assistance control using the acquired information. When the host vehicle determines an accelerator OFF timing when the vehicle stops at a red signal at an intersection, the ECU 22 outputs an instruction to induce an accelerator OFF to the information providing device 30. A specific process in the ECU 22 will be described later.

If acquiring infrastructure information from the road-vehicle communication device 10, the ECU 22 determines that there is reception from the infrastructure, and determines whether the host vehicle enters a service area before an intersection.

If infrastructure information is acquired and the host vehicle enters the service area before the intersection, the ECU 22 calculates at regular time intervals, the vehicle speed Vx of the host vehicle and the remaining distance L1 from the present position to the stop position SP, similar to ECU 21 according to the first embodiment. Further, the ECU 22 calculates the deceleration a at the time of accelerator OFF and the remaining time T1 of the blue signal, similar to ECU 21 according to the first embodiment, at regular time intervals. The ECU 22 determines whether the remaining time $T_1$ of the blue signal is shorter than the remaining distance $L_1$/the vehicle speed Vx, similar to ECU 21 according to the first embodiment, at regular time intervals.

When the remaining time $T_1$ of the blue signal is shorter than the remaining distance $L_1$/the vehicle speed Vx and thus the host vehicle needs to stop at the intersection at the red signal, the ECU 22 determines whether there is a upwardly convex gradient change point within the service area before the intersection based on the infrastructure information. In this determination, the ECU 22 determines whether the average gradient information up to the upwardly convex gradient change point is included as additional information in the infrastructure information.

When there is not the upwardly convex gradient change point within the service area before the intersection, the ECU 22 calculates a deceleration start position $L_{limit}$ using the average gradient $\tan \theta_0$ from the start position ST to the stop position SP of the service area before the intersection, similar to a general method. Here, the ECU 22 calculates the deceleration start position $L_{limit}$ using the current vehicle speed Vx, the deceleration a and the average gradient $\tan \theta_0$, by expression (10).

When there is an upwardly convex gradient change point in the service area before the intersection, the ECU 22 calculates the average gradient $\tan \theta_2$ from the upwardly convex gradient change point UP to the stop position SP, using the average gradient $\tan \theta_0$ from the start position ST to the stop position SP of the service area before the intersection and the average gradient $\tan \theta_1$ from the start position ST to the upwardly convex gradient change point UP that are included in the infrastructure information (see FIG. 6). Then, the ECU 22 calculates the deceleration start position $L_{limit}$ using the average gradient $\tan \theta_1$ or the average gradient $\tan \theta_2$ according to the present position of the host vehicle such that the vehicle speed of the host vehicle up to the upwardly convex apex does not become 0. When the present position is located between the start position ST and the upwardly convex gradient change point UP, the ECU 22 calculates the deceleration start position $L_{limit}$ using the current vehicle speed Vx, the deceleration a and the average gradient $\tan \theta_1$ from the start position ST to the upwardly convex gradient change point UP, by expression (10). When the present position is located between the upwardly convex gradient change point UP and the stop position SP, the ECU 22 calculates the deceleration start position $L_{limit}$ using the current vehicle speed Vx, the deceleration a and the average gradient $\tan \theta_2$ from the upwardly convex gradient change point UP to the stop position SP, by expression (10).

Then, the ECU 22 generates an image or an audio for the driver to induce the accelerator OFF at the deceleration start position $L_{limit}$, using the deceleration start position $L_{limit}$ and transmits a display signal for displaying the image or an audio signal for outputting the audio to an information providing device 30.

Figure 7:
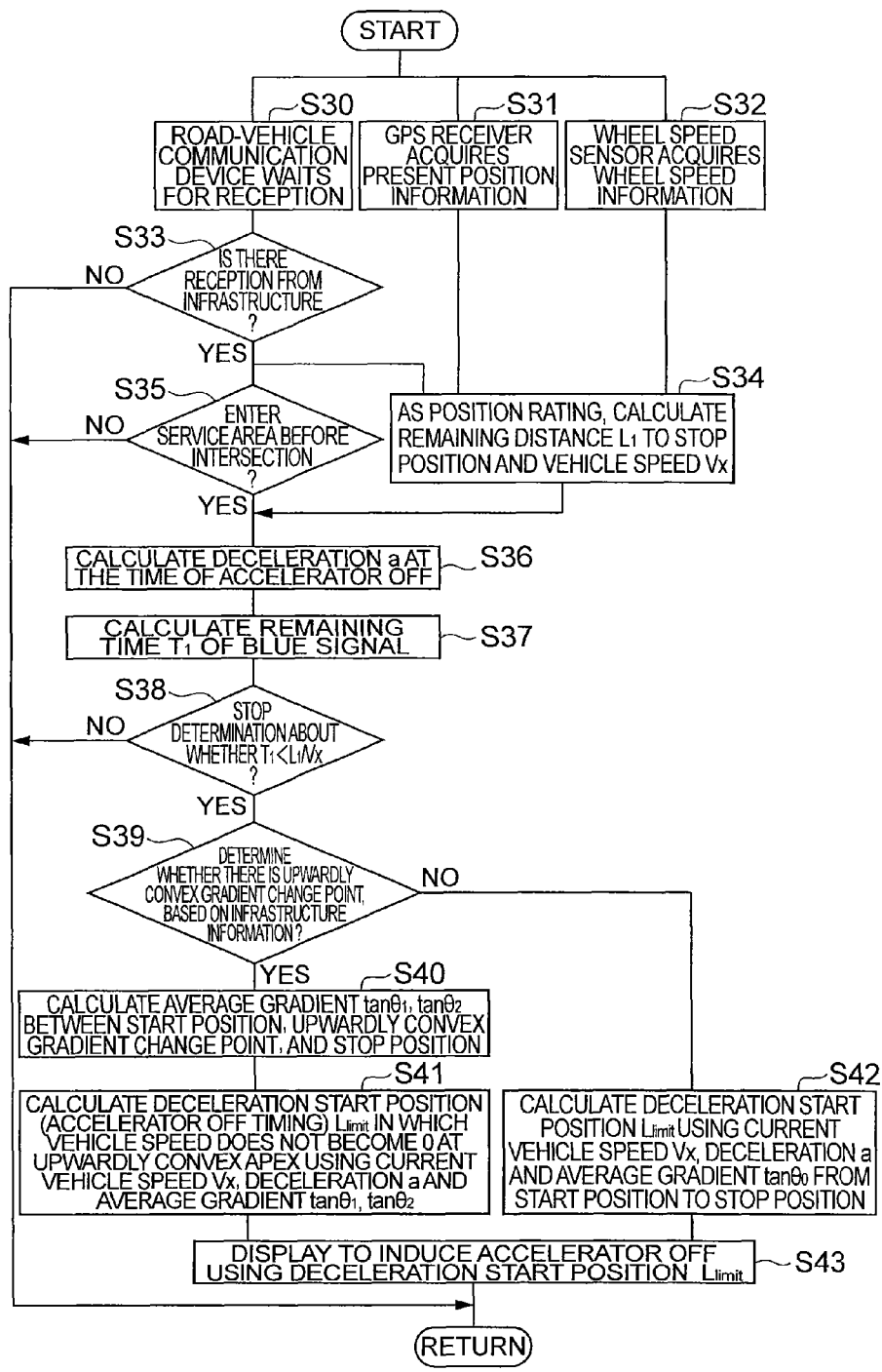
FIG. 7 is a flowchart showing a flow of deceleration stop assistance according to the second embodiment.
Figure 8:
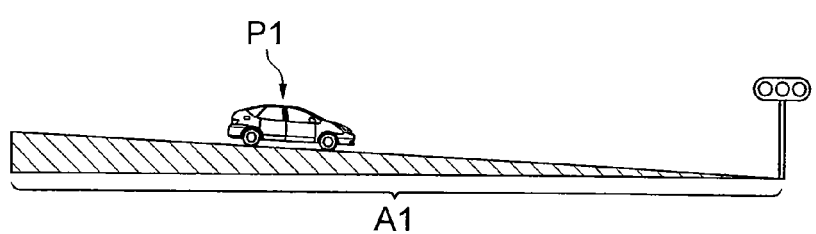
FIG. 8 is an example of a service area before an intersection having a gradient, (a) is a case where there is no gradient change point and (b) is a case where there is a gradient change point.
Figure 8:
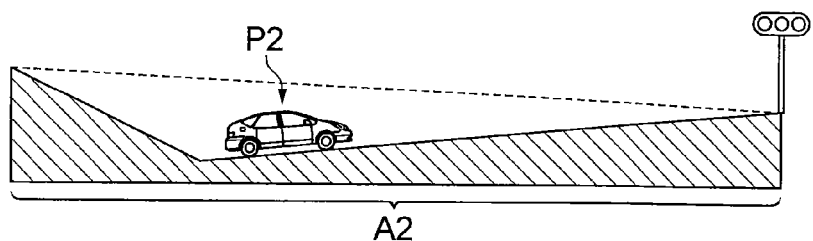

With reference to FIGS. 5 and 6, the operation of the deceleration stop assistance in the infrastructure cooperative system 2 will be described according to a flow chart of FIG. 7. FIG. 7 is a flowchart showing a flow of deceleration stop assistance according to the second embodiment.

Respective operations (S30, S31, and S32) with respective to the road-vehicle communication device 10, the GPS receiver 11, and the wheel speed sensor 12 are the same as respective operations (S10, S11, and S12) described in the first embodiment.

The ECU 22 determines at regular time intervals whether there is a reception from the infrastructure, based on presence or absence of the infrastructure information from the road-vehicle communication device 10 (S33). When it is determined that there is no reception from the infrastructure in the determination of S33, the ECU 22 ends the present process.

When it is determined that there is a reception from the infrastructure in S33, the ECU 22 calculates as the position rating, the vehicle speed Vx of the host vehicle in the present position using the wheel speed of each wheel, and the remaining distance $L_1$ from the present position PP to the stop position SP (S34).

The ECU 22 determines whether the host vehicle enters the service area before the intersection (S35). When it is determined that the host vehicle does not enter the service area before the intersection in S35, the ECU 22 ends the present process.

When it is determined that the host vehicle enters the service area before the intersection in S35, the ECU 22 calculates the deceleration a at the time of accelerator OFF using the current vehicle speed Vx, the road surface friction coefficient, and the like (S36). Further, the ECU 22 calculates the remaining time $T_1$ of the blue signal in the intersection that is an assistance object using the signal cycle information of the infrastructure information (S37). Then, the ECU 22 determines whether the remaining time $T_1$ of the blue signal is shorter than the remaining distance $L_1$/the vehicle speed Vx (S38). When it is determined in S38 that the remaining time $T_1$ of the blue signal is equal to or more than the remaining distance $L_1$/the vehicle speed Vx, the ECU 22 ends the present process.

When it is determined in S38 that the remaining time $T_1$ of the blue signal is shorter than the remaining distance $L_1$/the vehicle speed Vx, the ECU 22 determines whether there is the upwardly convex gradient change point within the service area before the intersection based on the infrastructure information (S39).

When it is determined that there is the upwardly convex gradient change point within the service area before the intersection in S39, the ECU 22 calculates the average gradient $\tan \theta_2$ from the upwardly convex gradient change point UP to the stop position SP using the average gradient $\tan \theta_0$ from the start position ST to the stop position SP and the average gradient $\tan \theta_1$ from the start position ST to the upwardly convex gradient change point UP (S40). Then, the ECU 22 calculates the deceleration start position (accelerator OFF timing) $L_{limit}$ using the average gradient $\tan \theta_1$ or the average gradient $\tan \theta_2$ according to the present position, by expression (10) (S41). At this time, when the present position is located between the start position ST and the upwardly convex gradient change point UP, the ECU 22 determines the deceleration start position $L_{limit}$ limit such that the vehicle speed up to the upwardly convex gradient change point UP does not become 0. On the other hand, when it is determined in S39 that there is no upwardly convex gradient change point in the service area before the intersection, the ECU 22 calculates the deceleration start position $L_{limit}$ using the average gradient $\tan \theta_0$ from the start position ST to the stop position SP by expression (10) (S42).

Then, the ECU 22 transmits a display signal or an audio signal for the driver to induce the accelerator OFF at the deceleration start position $L_{limit}$, using the deceleration start position $L_{limit}$ to the information providing device 30 (S43). When receiving a display signal, the information providing device 30 displays an image to induce the accelerator OFF at the deceleration start position $L_{limit}$, whereas when receiving an audio signal, the information providing device 30 outputs audio to induce the accelerator OFF at the deceleration start position $L_{limit}$ (S43). Depending on the image and audio, the driver turns off the accelerator OFF around the deceleration start position $L_{limit}$. Then, even when there is an upwardly convex gradient change point, even if the deceleration start position $L_{limit}$ is determined to be in front of the gradient change point, the vehicle can stop at a stop position of an intersection that is an assistance object while the vehicle speed up to the apex of the upward slope does not become 0. Incidentally, as shown in FIG. 6, there is a downwardly convex change point after the upwardly convex change point, but the vehicle can reach the stop position from the kinetic energy conservation law.

According to the infrastructure cooperative system 2, it is possible to determine an appropriate deceleration stop position, using the average gradient of a service area before the intersection and the average gradient up to the upwardly convex gradient change point, even in a case of a gradient having the upwardly convex change point, and it is possible to perform appropriate deceleration stop assistance using the deceleration stop position. When there is an upwardly convex change point, the vehicle can stop smoothly at a stop position by performing an accelerator OFF induction, using the appropriate deceleration stop position while the vehicle speed does not become 0 until reaching the upwardly convex gradient change point while sudden brake or re-acceleration is not applied. In this manner, it is possible to perform appropriate assistance with respect to the service area before the intersection including the gradient with the upwardly convex change point, and thus it is possible to increase an opportunity in which eco-driving assistance is established at the time of deceleration stop.

The foregoing has described the embodiments according to the present invention, but the present invention may be realized in various ways without being limited to the above embodiments.

For example, the present embodiment is applied to the drive assist apparatus which estimates an average gradient of an interval within a service area (an interval from a present position to a stop position, and the like) and performs driving assistance using the average gradient. However, the present embodiment may be applied to an information processing apparatus for vehicles which estimates an average gradient by the same process. Further, an instantaneous gradient may be estimated at a certain point (present position or the like) within the service area instead of the average gradient of the interval.

Further, the information by an image display and an audio output is provided as assistance to the driver in this embodiment, but a reminder, alternatively, a vehicle control such as brake assistance, accelerator assistance, shift assistance, and stopping of an engine or motor may be performed.

Further, the present embodiment shows as a gradient having a change point, an example of a gradient having an upwardly convex change point (a point changing from an upward gradient to a downward gradient) or a downwardly convex change point (a point changing from a downward gradient to an upward gradient), but can be applied to a gradient with a change point in which the gradient magnitude of the gradient (angle) changes in an upward slope or a downward slope. Further, the present embodiment is also applicable to a gradient with a plurality of upwardly convex or downwardly convex change points in a service area, or a gradient having a plurality of change points in which the gradient magnitudes change.

Further, the present embodiment is applied to deceleration stop assistance at an intersection having a traffic signal in the present embodiment, but may be applied to driving assistance accompanying various accelerations and decelerations such as railroad crossing, pause, deceleration stop assistance in a crosswalk or the like where pedestrians are present, and deceleration assistance other than stop and acceleration assistance.

Further, the present embodiment has a configuration in which average gradient information is received from the infrastructure, but average gradient information may be acquired from a map database of a navigation system for each link, when a vehicle is traveling on a certain road, an average gradient of a predetermined interval is estimated, the average gradient information is stored as travel history, and the travel history may be read during subsequent traveling, alternatively, multi-hop may be received from other vehicles using inter-vehicle communication.

Further, the first embodiment shows as gradient estimation means, a gradient estimation method which calculates an altitude difference $\Delta h$ based on a longitudinal acceleration detected in a longitudinal acceleration sensor and estimates a gradient using the $\Delta h$, but a method of estimating a gradient based on other items of driving status information may be used, or, a method which calculates altitude information using for example, GPS information, and estimates a gradient using the altitude information may be used.

Further, in the second embodiment, when there is an upwardly convex gradient, average gradient information up to an upwardly convex gradient change point is taken as additional information, but while height information and distance information (alternatively, positional information of an upwardly convex change point) up to an upwardly convex gradient change point is taken as additional information, average gradient information up to the upwardly convex gradient change point may be estimated from the height information and distance information. Further, when there is a downwardly convex gradient, a configuration, in which average gradient information up to a downwardly convex gradient change point is taken as additional information, is possible.

Further, deceleration stop assistance may be performed by combining the deceleration stop assistance of the first embodiment and the deceleration stop assistance of the second embodiment. With respect to deceleration stop assistance in the first embodiment, an appropriate assist timing can be determined when an assist timing is in the middle of the gradient, and with respect to the deceleration stop assistance in the second embodiment, an appropriate assist timing can be determined when an assist timing is in front of the upwardly convex gradient change point.

INDUSTRIAL APPLICABILITY

In the present invention, by estimating a gradient of a certain point or an average gradient of a certain interval within a predetermined interval based on average gradient information of the predetermined interval and driving status information of a host vehicle, in a case of a gradient with a change point, it is possible to estimate a gradient in a certain point or a certain interval before and after the change point with high accuracy, and to perform appropriate driving assistance using a very precise gradient that is estimated.

REFERENCE SIGNS LIST 1, 2 . . . infrastructure cooperative system, 10 . . . road-vehicle communication device, 11 . . . GPS receiver, 12 . . . wheel speed sensor, 13 . . . longitudinal acceleration sensor, 21 and 22 . . . ECU, 30 . . . information providing device

The invention claimed is:

1. A drive assist apparatus which performs driving assistance in a predetermined interval having a gradient, comprising:

average gradient information acquisition means for acquiring first average gradient information, from a start position within the predetermined interval to a stop position within the predetermined interval, from an external infrastructure, and second distance information, from the start position to a present position of the host vehicle;

driving status information acquisition means for acquiring driving status information of a host vehicle in the predetermined interval; and gradient estimation means for estimating second average gradient information, from the present position within the predetermined interval to the stop position within the predetermined interval, based on the first average gradient information acquired by the average gradient information acquisition means, the driving status information of the host vehicle that is acquired by the driving status information acquisition means, and the second distance information acquired by the average gradient information acquisition means, wherein the drive assist apparatus performs driving assistance, from the present position to the stop position, using the second average gradient information that is estimated by the gradient estimation means.

2. The drive assist apparatus according to claim 1, wherein the drive assist apparatus determines a timing of acceleration and deceleration, from the present position to the stop position, using the second average gradient information estimated by the gradient estimation means.

3. The drive assist apparatus according to claim 1, wherein the average gradient information acquisition means further acquires first distance information, from the start position to the stop position, the driving status information acquisition means acquires a longitudinal acceleration and a vehicle speed of the host vehicle as the driving status information, and the gradient estimation means estimates the second average gradient information based on the first average gradient information, the first distance information and the second distance information acquired by the average gradient information acquisition means, and the longitudinal acceleration and the vehicle speed of the host vehicle acquired by the driving status information acquisition means.

4. The drive assist apparatus according to claim 3, wherein the driving status information acquisition means acquires the longitudinal acceleration and the vehicle speed in the predetermined interval at each predetermined time, and the gradient estimation means
calculates third average gradient information, from the start position to the present position of the host vehicle, based on the longitudinal acceleration and the vehicle speed acquired by the driving status information acquisition means at the each predetermined time, and
estimates the second average gradient information based on the first average gradient information, the first distance information, the second distance information, and the third average gradient information.

5. The drive assist apparatus according to claim 4, wherein the gradient estimation means
calculates a first relative height, from the start position to the stop position, using the first average gradient information and the first distance information,
calculates an altitude difference, from the start position to the present position of the host vehicle, using the third average gradient information and the second distance information,
calculates a second relative height, from the present position of the host vehicle to the stop position, using the first relative height and the altitude difference,
calculates a remaining distance, from the present position of the host vehicle to the stop position, using the first distance information and the second distance information, and
estimates the second average gradient information using the second relative height and the remaining distance.

6. The drive assist apparatus according to claim 1, further comprising means for alerting a driver of the host vehicle to place an accelerator of the host vehicle in an OFF position based upon the second average gradient information.

7. A drive assist apparatus which performs driving assistance in a predetermined interval having a gradient, comprising:
a controller configured to:
acquire first average gradient information, from a start position within the predetermined interval to a stop position within the predetermined interval, from an external infrastructure, and second distance information, from the start position to a present position of the host vehicle;
acquire driving status information of a host vehicle in the predetermined interval; and
estimate second average gradient information, from the present position within the predetermined interval to the stop position within the predetermined interval, based on the acquired first average gradient information, the acquired driving status information, and the acquired second distance information,
wherein the drive assist apparatus performs driving assistance, from the present position to the stop position, using the estimate second average gradient information.

8. The drive assist apparatus according to claim 7, wherein the controller is further configured to alert a driver of the host vehicle to place an accelerator of the host vehicle in an OFF position based upon the second average gradient information.

9. The drive assist apparatus according to claim 7, wherein the controller is further configured to:
acquire first distance information, from the start position to the stop position,
acquire a longitudinal acceleration and a vehicle speed of the host vehicle as the driving status information, and
estimate the second average gradient information based on the first average gradient information, the first distance information, the second distance information, the longitudinal acceleration, and the vehicle speed of the host vehicle.

10. The drive assist apparatus according to claim 9, wherein the controller is further configured to:
acquire the longitudinal acceleration and the vehicle speed in the predetermined interval at each predetermined time
calculate third average gradient information, from the start position to the present position of the host vehicle, based on the longitudinal acceleration and the vehicle speed acquired at the each predetermined time, and
estimate the second average gradient information based on the first average gradient information, the first distance information, the second distance information, and the third average gradient information.

11. The drive assist apparatus according to claim 10, wherein the controller is further configured to:
calculate a first relative height, from the start position to the stop position, using the first average gradient information and the first distance information,
calculate an altitude difference, from the start position to the present position of the host vehicle, using the third average gradient information and the second distance information,
calculate a second relative height, from the present position of the host vehicle to the stop position, using the first relative height and the altitude difference,
calculate a remaining distance, from the present position of the host vehicle to the stop position, using the first distance information and the second distance information, and estimate the second average gradient information using the second relative height and the remaining distance.

12. The drive assist apparatus according to claim 7, wherein the drive assist apparatus determines a timing of acceleration and deceleration, from the present position to the stop position, using the second average gradient information.

\* \* \* \* \*